United States Patent [19]

Plamper et al.

[11] 4,362,228

[45] Dec. 7, 1982

[54] CONTROL LEVER MOUNTING

[75] Inventors: Gerhard R. Plamper, Valley City; Hartmut Kaesgen, Berea; Robert W. Rush, Jr., Elyria, all of Ohio

[73] Assignee: MTD Products Inc., Cleveland, Ohio

[21] Appl. No.: 199,574

[22] Filed: Oct. 22, 1980

[51] Int. Cl.³ ............................................. B60K 41/28
[52] U.S. Cl. .................................. 192/0.094; 74/526; 74/527; 56/11.3
[58] Field of Search ............... 192/0.094, 0.096, 12 R, 192/15, 16, 18 R; 74/527, 483 K, 526, 489; 56/11.3, 11.6, 11.8

[56] References Cited

U.S. PATENT DOCUMENTS 3,800,618  4/1974  Yoshigai .................................. 74/489
4,309,862  1/1982  Carlson .................................. 56/11.3

Primary Examiner—George H. Krizmanich
Attorney, Agent, or Firm—Woodling, Krost & Rust

[57] ABSTRACT

A mounting (12) for the throttle lever (13) and the dead-man control lever (22) to the handle (11) of an appliance such as a lawn mower, and including a locking bolt (30) carried by a leaf spring (27) to interfere with the movement of the dead-man control lever (22) so as to insure against accidental or unintentional movement of the dead-man control from one position to another.

10 Claims, 5 Drawing Figures

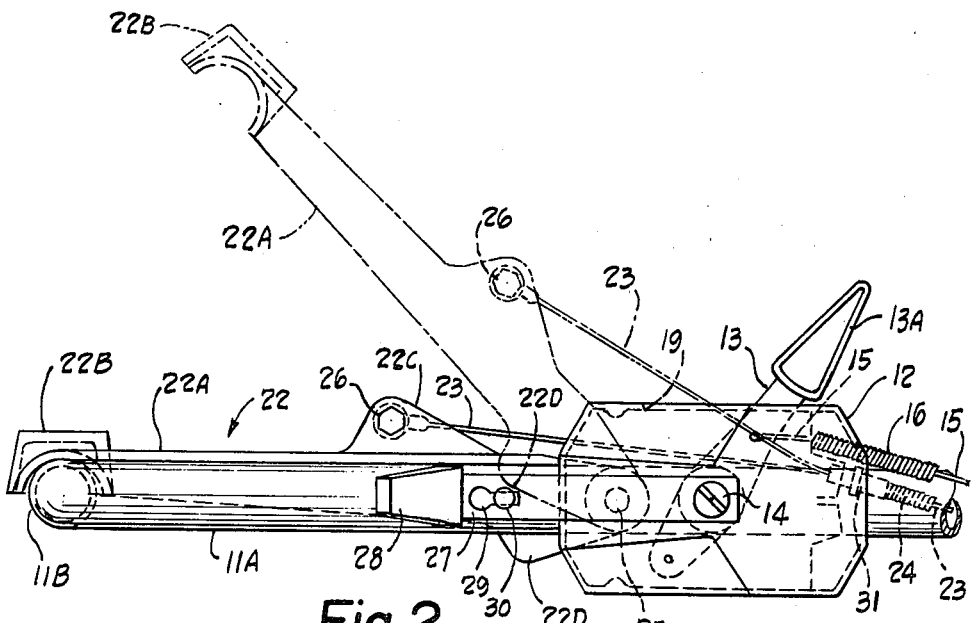

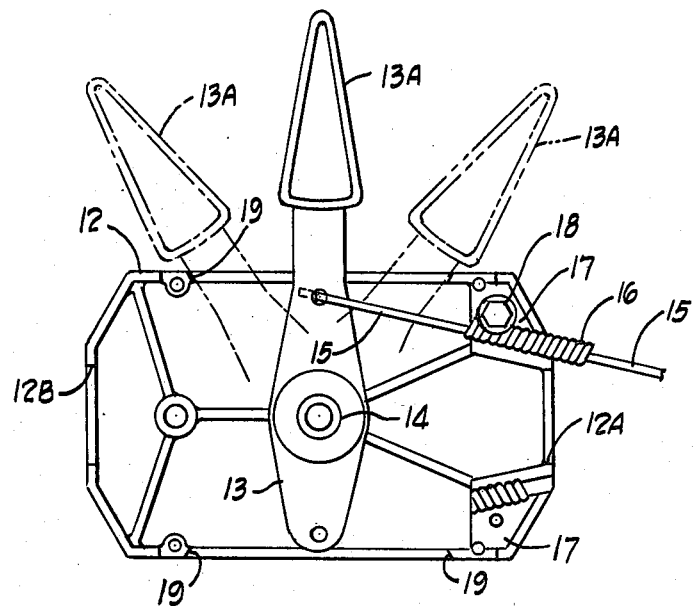
Fig. 3
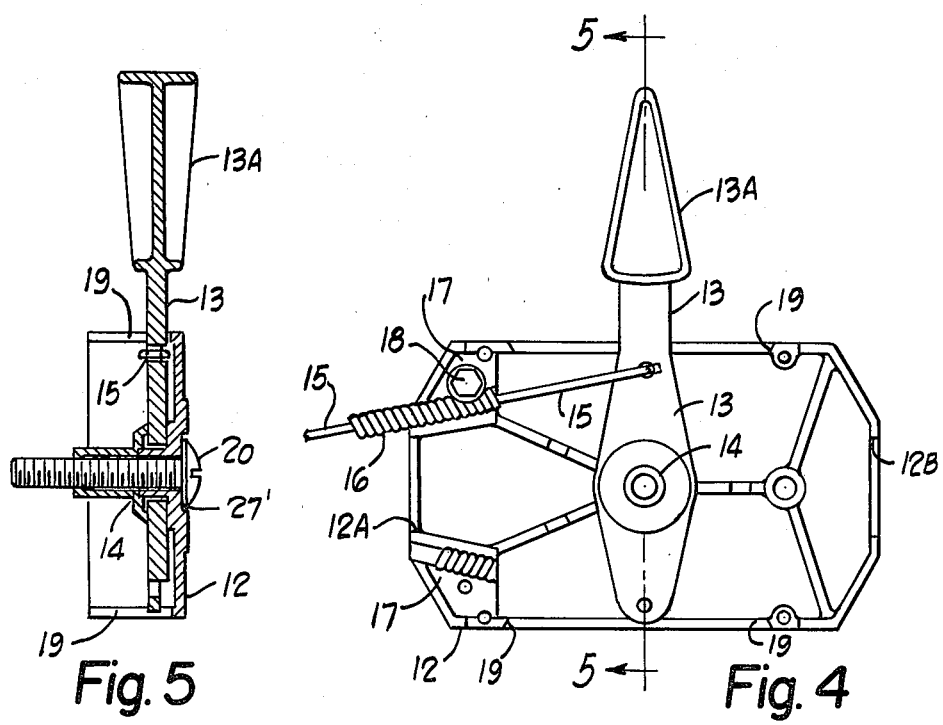
Fig. 5
Fig. 4

CONTROL LEVER MOUNTING

FIELD TO WHICH INVENTION RELATES

Our invention relates to such engine-driven appliances as lawn mowers, tillers, and the like in which a clutch mechanism or a clutch-brake mechanism is interconnected with the engine and the working part of the appliance, such as a rotary blade of a mower or the tines of a tiller, for the control of the working part, and wherein the clutch or clutch-brake mechanism is controlled by a dead-man control lever mounted on the handle of the appliance in position to be grasped by the operator of the appliance.

BACKGROUND ART OF THE INVENTION

The related art insofar as known to the Applicants is that found in rotary lawn mowers wherein a dead-man control lever is pivotally carried on the handle of the mower and wherein a throttle lever is also mounted on the handle of the mower within reach of the operator walking behind the mower holding the handle.

STATEMENT OF THE INVENTION

It is an object of our invention to provide a mounting member which carries both the pivotal mounting of a throttle member and of a dead-man control lever for ready reach by the operator.

Another object is to prevent the accidental or unpremeditated movement of the dead-man control lever to a position wherein the clutch or clutch-brake mechanism would be operated to permit the working part, such as a mower blade, to start to rotate before intended.

Another object is the provision for requiring two consecutive motions by the operator before a clutch or clutch-brake mechanism may be actuated to permit the working part of an appliance to operate.

Another object is to provide improved ease and facility in the control of an engine-driven appliance such as a lawn mower by means of a dead-man control lever.

Another object is to improve the safety provided by a unique dead-man control mechanism applied to an engine driven appliance, and at the same time to do it efficiently and economically.

Other objects and advantages may be observed from the following description of the invention in conjunction with the drawings.

FIGURES OF THE DRAWINGS

FIG. 1 is a plan view of our novel mounting and associated parts mounted on a handle of a lawn mower, showing some internal portions in broken lines;

FIG. 2 is a side view of the mounting shown in FIG. 1, showing some internal portions in broken lines;

FIG. 3 is a detailed drawing of the mounting box to which the throttle lever is pivotally carried, and shows the position of the parts when the mounting box is mounted on one of the two side arms of the handle;

FIG. 4 is a view similar to that of FIG. 3 but illustrating the positions of the parts when the mounting box is mounted on the other of the two side arms of the handle; and FIG. 5 is a corss-sectional view through the line 5—5 of FIG. 4.

DESCRIPTION

The present invention is here described in connection with its use as applied to a rotary type lawn mower having an engine driven rotary blade, the blade being operated by the engine through a clutch-brake mechanism which assures termination of rotation of the blade when the clutch-brake mechanism is actuated by a dead-man control upon the dead-man control being no longer grasped by the operator. The invention is also useful in connection with other appliances or machines having an engine driven working element. The best and preferred embodiment of the invention, as presently known to the inventor, is as herein described.

The particular lawn mower used by way of example in this case has a handle extending rearwardly and upwardly from the mower proper (not shown). The handle 11 is of the U-shape type in which two side bars are joined in the rear by a cross-bar ordinarily grasped by the operator while walking behind the mower and controlling the movements of the same. In the drawing only one side bar 11A and a half of the cross-bar 11B are shown, it being understood that twin parts not shown are joined to the side bar and cross-bar illustrated to comprise the usual and well known U-shaped handle 11.

A mounting member 12, in the form of a molded plastic box, of two parts embracing the side bar 11A on one side of the handle 11, is secured to the handle side bar 11A. This is done by a pivot portion extending from each of the mating two parts of the box 12 in alignment with each other and through a transverse hole in the handle side bar 11A to form the pivot mounting 14. The screw bolt through the pivot mounting 14 and the said transverse hole holds the two parts of the box 12 together and securely to the handle side bar 11A.

A throttle lever 13 is pivotally mounted on pivot mounting 14 so as to be positioned to be manually swung forwardly and rearwardly. A handle 13A of plastic material is mounted on the free outer end of the throttle member 13. A cable or wire 16 is connected at one of tis ends to the throttle lever 13 and at the other of its ends is connected to the controls of the engine (not shown) whereby the speed and stopping of the engine is manipulated by the throttle lever 13. To accommodate for different types of engine controls used by different engine manufacturers, it is provided that the cable 15 may be attached to the throttle lever near its upper free end as illustrated, or alternatively, near its lower free end. This will assure that in all cases maximum speed is obtained by moving the handle 13A forwardly and lesser speed is obtained by moving the handle 13A rearwardly, that is in an opposite direction.

A sheath or protective casing 16 around the cable 15 is secured firmly to the mounting box 12 by a clamp 17 which is tightened by a bolt 18. The cable 15 slides longitudinally through the sheath 16.

A long slot 19 extends longitudinally through a wall of the mounting box 12 on one side thereof for accommodating the swinging of the throttle lever 13. A label marking the degrees of speed may be applied to the wall of the mounting box 12 adjacent the slot 19 for indicating to the operator the markings for the degrees of speed.

A "dead-man" control lever is mounted on the handle 11 in a position to be grasped by the operator while holding the cross bar 11B of the handle 11. As is well known, a dead-man control has the function of permitting an appliance or machine to continue to operate in its intended and usual manner when the operator continues to grasp the dead-man control. However, the dead-man control is intended and designed to terminate such operation of the appliance or machine in its intended and usual manner, as for example to terminate the rotation of the blade of a rotary lawn mower, when the dead-man control is released by the operator.

The dead-man control lever denoted by the reference character 22 is of a U-shape form having two side arms 22A (of which only one is shown) joined at the rear by a cross-arm 22B (of which only a half is shown). The cross-arm 22B is generally co-extensive with the handle cross-bar 11B and is adapted to lie shown adjacent to it as shown in full lines in the drawings. The side arms 22A are disposed in upright planes generally coinciding with the side bars 11A of the handle. The side arms 22A provide that the dead-man control lever may be swung to perform the function of the dead-man control.

The forward free ends of the side arms 22A are connected by a pivot connection 25 to the mounting box 12 and to the handle side bar 11A, the pivot connection 25 extending through aligned openings in them. The side arms 22A (of which only one is shown) may swing on the pivot connection 25 in an upright plane parallel to the handle side bar 11A between the lowered position shown in full lines in FIG. 2, and the upper position shown in broken lines in FIG. 2.

The side arm 22A has a portion 22C extending upwardly therefrom as shown. This portion 22C provides a location and mounting for the connection 26 on the portion 22C for the connection 26 securing cable or wire 23 to the side arm 22A. This cable 23 leads through a sheath or cover 24 (clamped to mounting box 12), the cable 23 being movable longitudinally through a fair lead 31 secured to the mounting box 12.

The cable 23 is connected at its other end to the clutch-brake mechanism (not shown) associated with the engine. The mechanism imparts a resilient pull on the cable 23 so that the cable is biased so as to pull or draw the side arm 22A to swing upwardly so that the dead-man control is biased to assume the raised position B shown in FIG. 2.

Upon the operator pressing downwardly on the cross arm 22B to press it towards the handle cross-bar 11B, and grasping both cross-bar 11B and cross arm 22B in the operator's hand, the dead-man control is moved to, and held in, the position shown in FIG. 1 and shown in full lines in FIG. 2. In this position the clutch-brake mechanism is actuated through cable 23 (interconnection portion 22C and the mechanism) to place the mechanism in a clutched and un-braked condition. Upon release by the operator of the cross-arm 22B the dead-man control swings upwardly under the biased pull of cable 23 to the position B shown in broken lines in FIG. 2. In this situation, the clutch-brake mechanism is in an unclutched and braked condition whereby movement of the driven working part, such as the blade of a lawn mower, is terminated and the working part is still.

To prevent the dead-man control from accidentally and unintentionally moving from the raised position B to the lowered position A, there is provided a locking arrangement which must be first actuated before the side arm 22A may move downwardly from its raised position B.

A leaf spring 27 has its forward end firmly anchored by screw bolt 20 to a side of mounting box 12. The bias of spring 27 is such as to resiliently urge its opposite free end toward the handle side arm 11A and to the position shown in FIGS. 1 and 2. A plastic handle 28 is secured to the end of leaf spring 27 as shown, and the end portion of leaf spring is bent or angled outwardly as shown for readily grasping the handle 28.

Near the outer or free end of leaf spring 27 it is provided with a "key-hole" 29 and in this key-hole 29 there is so secured a locking bolt 30 so that the bolt 30 swings with the flexing swing of leaf spring 27. The bolt extends substantially normal to the plane of the leaf spring 27 through a transverse opening provided in handle side arm 11A to the other side of the side arm 11A. The length of the bolt 30 is such that upon the leaf spring 27 being located close to, and against, the side of the mounting box 12, such as shown in FIGS. 1 and 2, then the bolt extends out from the handle side arm 11A on the other side into the path of dead-man control side arm 22A as it may swing in an upright plane on pivot pin 25.

The side arm 22A has a downwardly extending portion 22D so formed as to provide an abutment which engages the bolt 30 when it protrudes out from the handle side arm 11A into the downwardly swinging path of side arm 22A. Thus, when the dead-man control is in raised position B shown in FIG. 2, it cannot be lowered because of the interference of bolt 30 engaging the lower edge of downwardly extending portion 22D. The dead-man control cannot accidentally or unintentionally be moved to actuate the clutch-brake mechanism because of this safety interlocking arrangement.

When it is desired to overcome this locking arrangement and to permit the dead-man control lever to be depressed to its lowered position A shown in FIGS. 1 and 2, the operator manually grasps the handle 28 on the leaf spring 27 and flexes the leaf spring outwardly to draw the bolt 30 back sufficiently to clear the lower edge of the downwardly extending portion 22D and thus to remove the interference to the downwardly swinging of the dead-man control lever.

Upon the dead-man control side arm 22A being depressed to where the handle cross bar 11B and the cross arm 22B are disposed close together and clasped in the hand of the operator, the end of bolt 30 engages the side surface of downwardly protruding portion 22D above the level of its lower edge. The bias of leaf spring 27 is such as to urge the bolt 30 in engagement with the side surface of portion 22D and when the dead-man control is released to where the dead-man control side arm 22A is in its raised position B, the bolt 30 under the bias of spring 27 immediately and automatically moves into its locking position under the lower edge of portion 22D and there locks the parts in the raised position B.

As will be seen, an efficient mounting is provided for both the throttle lever and the dead-man control lever, and a safety locking arrangement is provided against accidental and unintentional actuation of the clutch-brake mechanism by movement of the dead-man control.

By reason of the structure and arrangement of parts of this novel mounting, the mounting may be applied to the right side handle part or to the left side handle part of handles having two such parts extending back rearwardly generally parallel to each other. In the case of some engines utilized on the appliance, the controls disposed on the engine are such that it is more convenient and efficient to have the control lever mounting secured to the left side handle part as shown in FIG. 3. In other cases the disposition of the controls mounted on the particular engine utilized is such that it is more convenient and efficient to have the novel control lever secured to the right side handle part as illustrated in FIG. 4.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mounting for the controls of an engine driven appliance such as a mower and the like, the appliance having a handle extending therefrom, the handle having a rearwardly disposed bar for being grasped by the operator of the appliance, a driven working part such as a mower blade adapted to be driven by the appliance engine, and a clutch mechanism for clutching and declutching the connection between the engine and driven working part, a dead-man control lever adapted to be operable by the operator grasping the rearwardly disposed bar of said handle, the dead-man control lever controlling the operation of said clutch mechanism through a cable interconnecting the clutch mechanism and the dead-man control lever, and a throttle lever for controlling the operation of the said appliance engine through a cable interconnecting the throttle lever and the said engine, the improvement comprising the combination of a mounting member secured to said handle within reach of the operator, said mounting member including a first pivot pin member extending into said handle, and providing a pivotal mounting for said throttle lever, the mounting member having a space provided therein for permitting the throttle member to swing within a range between spaced stops provided by the mounting member, the said mounting member including a second pivot pin extending into said handle at a distance along the handle from the said first pivot pin and providing a pivot mounting for said dead-man control lever, the mounting member having a space provided therein for permitting the said dead-man control lever to extend from the mounting member and to swing in an upright plane and along the said mounting member, and a locking member for selectively locking the dead-man control lever against pivotal movement toward a first position permitting movement of the clutch mechanism to clutched condition, said locking member being selectively movable to permit the dead-man control lever to move toward a position moving the clutch mechanism to unclutched condition, said locking member including a bolt-carrying member anchored to the said mounting member, biasing means biasing the bolt-carrying member toward said upright plane, said bolt-carrying member carrying an engaging member adjacent its free end for manually moving the bolt-carrying member against the bias of the said biasing means away from said upright plane, and a bolt secured to said bolt-carrying member and extending laterally of said mounting member to be moved by said bolt-carrying member into and out of said upright plane, the said bolt upon being moved across said upright plane by the bolt-carrying member under the urging of said biasing means protruding athwart the path of said dead-man control lever to bar its movement toward the first position permitting movement of the clutch mechanism to clutched condition, the dead-man control lever being movable by the operator to a second position to permit the movement of the clutch mechanism to clutched condition upon the withdrawal of said bolt from athwart the path of the dead-man control lever in said upright plane by the operator manually moving the bolt-carrying member and bolt carried thereby against the bias of the said biasing means away from said upright plane.

2. The combination claimed in claim 1 and in which said bolt-carrying member and said biasing means are comprised of a leaf spring disposed parallel to, and anchored at one of its ends to, said mounting member, and said bolt extending normal to the leaf spring is interlocked with the leaf spring to move toward and away from said parallel plane in and out of the path of said dead-man control lever upon manual flexing of the leaf spring.

3. The combination claimed in claim 2 and in which said leaf spring has an angular portion at its free end and a handle on said free end to provide for ready manual flexing of the leaf spring to move the bolt carried thereby away from said upright plane and out of the path of said dead-man control lever.

4. The combination claimed in claim 2 and in which said bolt is extended through an opening in the handle transversely thereof from the leaf spring to the path of said dead-man control lever.

5. In a mounting for a dead-man control lever of an engine-powered appliance having a handle extending therefrom and having a combined clutch and brake mechanism associated with the engine, said dead-man control lever having an end portion disposed in a plane generally parallel to said handle, and a pivot mounting carried by said handle and pivotally mounting said dead-man control lever to the handle to permit the said end portion of the dead-man control lever to swing in said plane, said dead-man control lever being adapted to control the operation of said clutch and brake mechanism upon movement of the dead-man control between a first position and a second position, the improvement of a locking member carried by the said handle in the region of said pivot mounting, said locking member including a bolt-carrying member and a bolt carried thereby, said bolt-carrying member being biased toward the said plane in which the dead-man control lever may swing, said bolt protruding from the bolt-carrying member to extend across said plane to interfere with said dead-man control lever in swinging toward a first position of said positions, the bolt-carrying member being manually movable to withdraw said bolt from said plane to clear the dead-man control lever and to permit it to swing from a second position of said positions to said first position.

6. The improvement claimed in claim 5 and in which the bolt-carrying member is a leaf spring secured at one end along side the handle and biased to swing its other end toward said plane, in which the other end is disposed for ready manual grasping of the same to move the leaf spring against the bias thereof away from said handle, and in which the said bolt is interlocked with said leaf spring between its said opposite ends to protrude normal to the plane of said leaf spring.

7. The combination claimed in claim 5 and in which said dead-man control lever is provided with anchoring means at a distance from said pivot mounting for attachment to a cable connectable to said clutch and brake mechanism for operating the same, and in which said dead-man control lever is provided with an abutting portion at a distance from said pivot mounting in position to abut said bolt upon its protrusion into said plane into the path of the dead-man control lever.

8. The combination claimed in claim 5 and including a mounting block secured to said handle, and to which said pivot mounting for the dead-man control lever is secured, and to which said bolt-carrying member is secured.

9. The combination claimed in claim 8 and in which a throttle lever for controlling the said engine is pivotally carried by said mounting block.

10. The combination claimed in claim 8 and in which said mounting block is apertured to accommodate the handle extending therethrough, and includes open space for accommodating the dead-man control lever extending from the mounting block.

* * * * *